United States Patent
Teragawa (10) Patent No.: US 8,436,960 B2
(45) Date of Patent: May 7, 2013

(54) PRISM SHEET AND LIQUID CRYSTAL DISPLAY

(75) Inventor: Daisuke Teragawa, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 327 days.

(21) Appl. No.: 12/447,562

(22) PCT Filed: Aug. 9, 2007

(86) PCT No.: PCT/JP2007/065599
§ 371 (c)(1),
(2), (4) Date: Apr. 28, 2009

(87) PCT Pub. No.: WO2008/056473
PCT Pub. Date: May 15, 2008

(65) Prior Publication Data
US 2010/0066942 A1    Mar. 18, 2010

(30) Foreign Application Priority Data
Nov. 9, 2006  (JP) .................................. 2006-304313

(51) Int. Cl.
G02F 1/1335  (2006.01)
F21V 7/04    (2006.01)

(52) U.S. Cl.
USPC ............... 349/62; 349/64; 362/606; 362/620; 362/626

(58) Field of Classification Search ...................... 349/62
See application file for complete search history.

(56) References Cited

U.S. PATENT DOCUMENTS

| | | | |
|---|---|---|---|
| 7,364,342 B2* | 4/2008 | Parker et al. | 362/626 |
| 7,488,095 B2* | 2/2009 | Shim et al. | 362/362 |
| 7,529,048 B2* | 5/2009 | Lin | 359/831 |
| 7,618,164 B2* | 11/2009 | Wang et al. | 362/339 |
| 2004/0051825 A1 | 3/2004 | Lee et al. | |
| 2005/0147374 A1 | 7/2005 | Gardiner | |
| 2005/0243575 A1 | 11/2005 | Kunimochi | |
| 2005/0280752 A1 | 12/2005 | Kim et al. | |
| 2006/0049749 A1 | 3/2006 | Ishikawa et al. | |
| 2006/0072342 A1 | 4/2006 | Kim et al. | |
| 2006/0146571 A1 | 7/2006 | Whitney | |
| 2006/0256582 A1* | 11/2006 | Chuang | 362/620 |
| 2010/0302479 A1* | 12/2010 | Aronson et al. | 349/64 |

FOREIGN PATENT DOCUMENTS

| | | |
|---|---|---|
| JP | 2003-140126 A | 5/2003 |
| JP | 2004-110025 A | 4/2004 |
| JP | 2005-317435 A | 11/2005 |
| JP | 2006-53565 A | 2/2006 |
| JP | 2006-100257 A | 4/2006 |
| WO | WO 2005/069045 A1 | 7/2005 |

* cited by examiner

*Primary Examiner* — Hemang Sanghavi
(74) *Attorney, Agent, or Firm* — Birch, Stewart, Kolasch & Birch, LLP (57) ABSTRACT

A prism sheet having a function for preventing damage while assuring light collecting performance, and a liquid crystal display employing it. The prism sheet (6) has a first major surface on which light from a light source impinges, and a second major surface from which the incident light exits. A plurality of first prism rows (6*a*) having triangular cross-section are formed in parallel on the second major surface. A plurality of second prism rows (6*b*) having a round top and higher than the first prism rows (6*a*) are also provided on the second major surface.

3 Claims, 8 Drawing Sheets

PRISM SHEET AND LIQUID CRYSTAL DISPLAY

TECHNICAL FIELD

The present invention relates to a prism sheet and a liquid crystal display employing the same.

BACKGROUND ART

Figure 12:
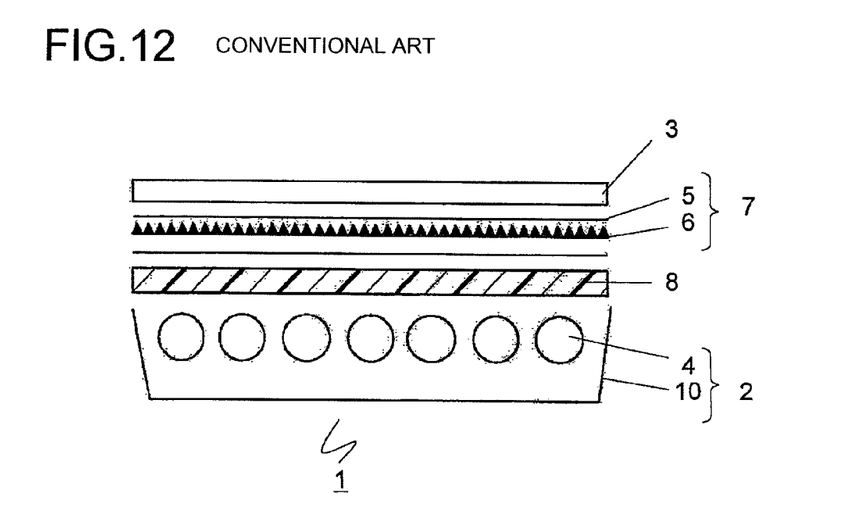
FIG. 12 An exploded perspective view of a conventional liquid crystal display device.

FIG. 12 is a sectional view showing a conventional liquid crystal display device 1. The liquid crystal display device, of the direct-lit type, is composed of an illuminating device 2 and a liquid crystal panel 3; the illuminating device 2 is disposed behind the liquid crystal panel 3. In the illuminating device, a plurality of linear light sources 4 are arrayed in parallel, and between the liquid crystal panel 3 and the illuminating device 2, there are disposed an optical sheet 7, which includes a prism sheet 6, and a diffusion plate 8. In such a liquid crystal display device 1, the light emitted from the linear light sources 4 passes through the diffusion plate 8 and the optical sheet 7, and reaches the liquid crystal panel 3.

Figure 13:
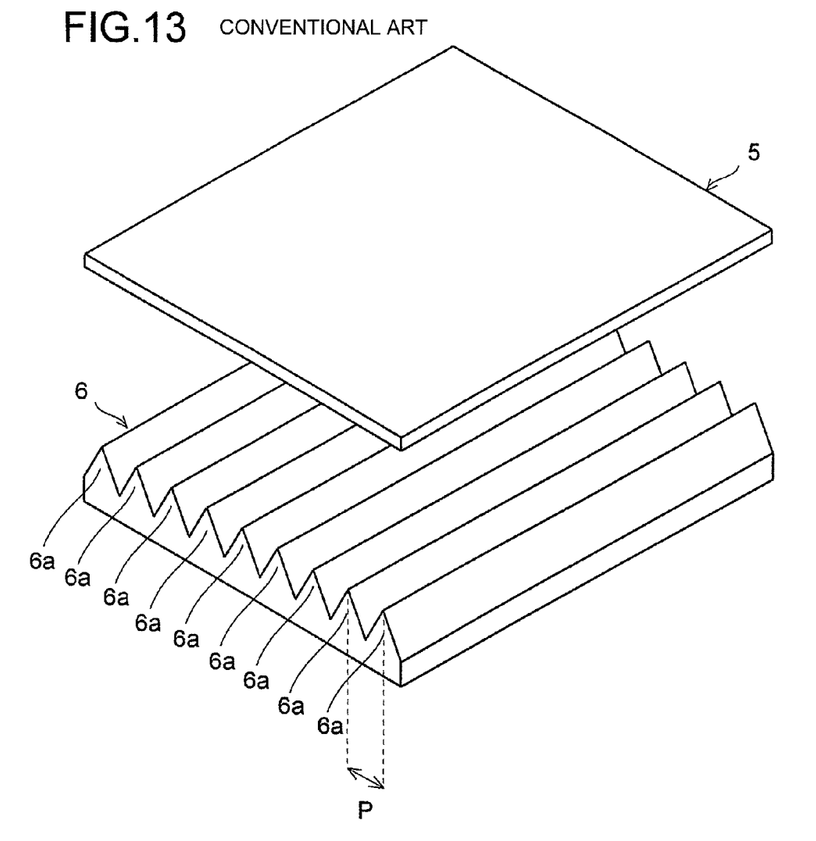
FIG. 13 An exploded perspective view showing part of a prism sheet and a diffusion sheet included in the conventional liquid crystal display device.

The optical sheet 7 is composed of various sheets such as a diffusion sheet 5, a prism sheet 6, a lens sheet, and a polarizing film, and is so disposed as to cover the main surface of the diffusion plate 8. FIG. 13 is an exploded perspective view showing, among the optical sheet, in which those sheets are laid together, parts of the diffusion sheet 5 and the prism sheet 6. As shown in FIG. 13, the prism sheet 6 is used, with a view to enhancing the front-face brightness of the liquid crystal display panel 3, to condense the light from the linear light sources 4 toward the liquid crystal panel 3, and has a prism surface formed on its main surface facing the liquid crystal panel. This fine prism surface is composed of first prism rows 6a formed with a predetermined pitch p and having a triangular cross section.

Figure 14:
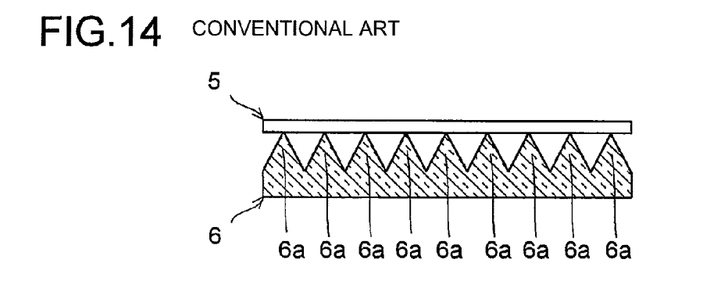
FIG. 14 A sectional view showing part of the prism sheet and the diffusion sheet included in the conventional liquid crystal display device.

FIG. 14 is a sectional view showing the state of the prism sheet 6 and the diffusion sheet 5 in FIG. 13 laid on one another; in a case where the optical sheet is composed of the plurality of sheets laid together as shown in FIG. 14, the peaks of the first prism rows 6a on the surface of the prism sheet 6 make contact with the main surface of the abutting diffusion sheet 5. With this structure, when an external force acts on the optical sheet, the peaks of the first prism rows 6a may rub against the main surface of the diffusion sheet 5 and become scratched. If these scratches are visible from the viewing direction of the display device, they constitute a problem in the quality of the liquid crystal display device.

Thus, to solve this problem, conventionally, methods have been proposed (see Patent Documents 1 and 2) in which the peaks of the prism rows are not made sharp but are formed to have gently curved surfaces.
Patent Document 1: JP-A-2004-110025 Publication
Patent Document 2: JP-A-2005-317435 Publication

DISCLOSURE OF THE INVENTION

Problems to be Solved by the Invention

When, however, the peaks of the prism rows are given a greater radius so that they have gently curved surfaces with a view to preventing scratches on them, the prism lenses then have a lower light-condensing ability and do not function as prisms as fully as they are expected to.

In view of the above problems, an object of the present invention is to provide a prism sheet having a scratch-preventing function while offering a satisfactory light-condensing ability, and to provide a liquid crystal display device employing it.

Means for Solving the Problem

To achieve the above object, a prism sheet according to a first aspect of the present invention includes a first main surface on which the light from light sources is incident and a second main surface from which the incident light emerges. Here, a plurality of first prism rows with a triangular cross section are formed in parallel on the second main surface. Moreover, a plurality of second prism rows are formed on the second main surface, and the second prism rows have peaks higher than those of the first prism rows and rounded.

With this structure, when the prism sheet, in which on its second main surface where a plurality of first prism rows with a triangular cross section are formed in parallel, a plurality of second prism rows whose peaks are higher than those of the first prism rows and rounded, is used with a plurality of other sheets laid over it, since the peaks of the second prism rows are formed higher than those of the first prism rows, the peaks of the second prism rows make contact with the main surface of the sheets laid over it and support the sheets. Thus, under normal conditions, the peaks of the first prism rows do not make contact with the main surface of the abutting sheet, and it is possible to prevent the peaks of the first prism rows from rubbing against the main surface of the abutting sheet and being scratched. Therefore, it is possible to make the peaks of the first prism rows sharp, thereby to obtain a satisfactory light-condensing ability of the prism rows.

The second prism rows, with their peaks having a rounded cross section, can steadily hold the main surface of the sheet, though with a lower light-condensing ability compared with the first prism rows, and can prevent the peaks of the second prism rows themselves from being scratched.

According to the present invention, in the prism sheet with the structure described above, the radius of the cross-sectional shape of the peaks of the second prism rows may be 3 μm or more.

With this structure, by forming the second prism rows with the radius of their peaks 3 μm or more, the abutting sheet can be supported steadily, and a satisfactory light-condensing ability of the second prism rows can be obtained.

According to the present invention, in the prism sheet with the structure described above, a plurality of concave parts with low peaks may be formed on the second prism rows, and the cross-sectional shape of the peaks of the concave parts may be sharp.

With this structure, a plurality of concave parts with low peaks are formed on the second prism rows, and with the sharp cross section of the concave parts, regions with high light-condensing ability can be provided in the second prism rows, and the light-condensing ability of the entire sheet can be enhanced. In the second prism rows, the greater the proportion of the sharp parts, the greater the effect of enhancing the brightness of the entire prism sheet. Thus, by forming the second prism rows mostly with concave parts and leaving a few regions other than concave parts, it is possible to steadily support the overlaying sheet while achieving the effect of enhancing the brightness of the prism sheet. Note that the sheet laid on the second main surface side of the prism sheet is supported by the parts other than the concave parts in the second prism rows, and thus the peaks of the first prism rows and the concave parts are prevented from being scratched.

According to the present invention, in the prism sheet with the structure described above, the parts other than the concave parts in the second prism rows may be disposed at random as seen in a plan view of the second main surface.

With this structure, by disposing the parts other than the concave parts in the second prism rows at random as seen in a plan view of the second main surface, even when the prism sheet is large, it is possible to support the entire optical sheets laid on the second main surface side by the parts other than the concave parts in the second prism rows, and to prevent the peaks of the first prism rows and the concave parts from being scratched. Moreover, in the concave parts, a predetermined degree of light-condensing ability of the entire sheet is obtained.

The present invention also provides a liquid crystal display device including: a prism sheet with the structure described above; light sources so disposed as to able to emit light onto the first main surface of the prism sheet; and a liquid crystal panel disposed on the second main surface side of the prism sheet and controlling the light emitted from the light source and transmitted through optical components.

With this structure, by including the prism sheet as part of the optical sheet in the liquid crystal display device, it is possible to prevent the prism sheet from being scratched while offering a satisfactory light-condensing ability of the prism sheet, and to cope with devices of larger sizes.

Advantages of the Invention

According to the present invention, it is possible to easily obtain a prism sheet having a scratch-preventing function while offering a satisfactory light-condensing ability, and a liquid crystal display device employing it.

LIST OF REFERENCE SYMBOLS

1 Liquid crystal display device
2 Illuminating device
3 Liquid crystal panel (light-controlling member)
4 linear light sources
5 Diffusion sheet
6 Prism sheet
6a First prism row
6b Second prism row
6c Concave parts
6d Convex parts
7 Optical sheet
8 Diffusion plate
9 Display-device frame
10 Lamp housing
11 Lamp holder
12 Illuminating-device frame

BEST MODE FOR CARRYING OUT THE INVENTION

Embodiments of the present invention will be described below with reference to the accompanying drawings. The invention provides a prism sheet that is excellent in light condensation and scratch prevention, and a liquid crystal display device employing it. The structures of these will be described in more detail using diagrams, etc. Such parts as find their counterparts in the conventional examples in FIGS. 12 to 14 are identified by common reference signs, and no detailed description of them will be repeated.

First Embodiment

Figure 1:
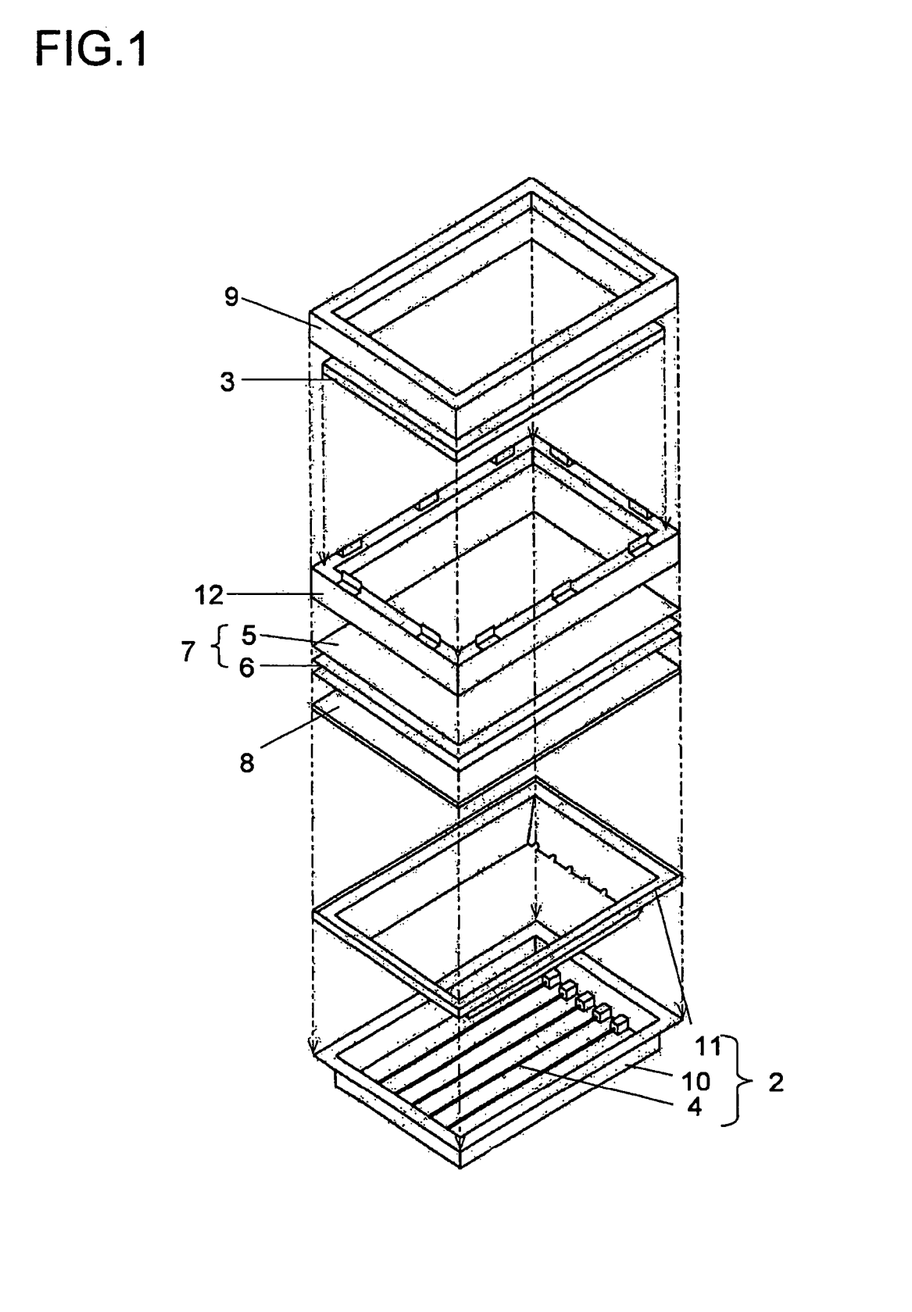
FIG. 1 An exploded perspective view of a liquid crystal display device according to a first embodiment of the present invention.

FIG. 1 shows an exploded perspective view illustrating a liquid crystal display device according to this embodiment. The liquid crystal display device 1 includes an illuminating device 2, a liquid crystal panel (light-controlling member) 3, and a display-device frame 9. The illuminating device 2 is composed of linear light sources 4, a lamp housing 10, a reflecting sheet (not shown), and a lamp holder 11; a diffusion plate 8 made of resin, an optical sheet 7, and an illuminating-device frame 12 are disposed between the liquid crystal panel 3 and the illuminating device 2.

A driving device (not shown) is connected to the liquid crystal panel 3 and the linear light sources 4 to drive and control the liquid crystal panel 3 and the linear light sources 4. Here, a driving device collectively refers to circuits, devices, and the like for achieving such driving and control. The liquid crystal panel 3 has liquid crystal sealed in between opposing substrates.

In the liquid crystal display device 1, the light emitted from the light sources 4 passes through the diffusion plate 8 and the optical sheet 7, and is incident on the liquid crystal panel 3; by each pixel (or each cell) of the liquid crystal panel 3, the light intensity (gradation) is controlled or the light is colored. That is, the liquid crystal panel 3 generates display light by controlling the intensity and the color of the light emitted from the light sources 4 and transmitted through the diffusion plate 8 and the optical sheet 7.

As the light sources 4, other than cold cathode fluorescent lamps (CCFLs), light-emitting diodes (LEDs), hot cathode fluorescent lamps (HCFLs), external electrode fluorescent lamps (EEFLs), xenon lamps or the like can be used.

The diffusion plate 8 is a flat plate member made of resin such as acrylic resin (PMMA), methacryl-styrene (MS), polystyrene (PS), polycarbonate (PC), or cycloolefin polymer (COP, for example, "Zeonor®", a product of Zeon Corporation, Japan). The diffusion plate 8 diffuses the light from the lamps, and on top of it is disposed the optical sheet 7.

The optical sheet 7 is composed of any one or more of various optical sheets such as a diffusion sheet 5, a prism sheet 6, a lens sheet, and the like. Note that the number of various sheets composing the optical sheet 7 is not limited to three as shown in the diagram. In addition, a plurality of optical sheets of the same kind (for example, diffusion sheets) may be included in the optical sheet. In the following description, the diffusion sheet 5 is laid over the prism sheet 6 as shown in FIG. 1; however, there is no particular restriction on the type of sheets laid over the prism sheet 6.

The optical sheet 7, with a peripheral part of it held by the illuminating-device frame 12 and the lamp housing 10, is fixed to the illuminating-device 2 with, for example, screws (not shown).

Figure 2:
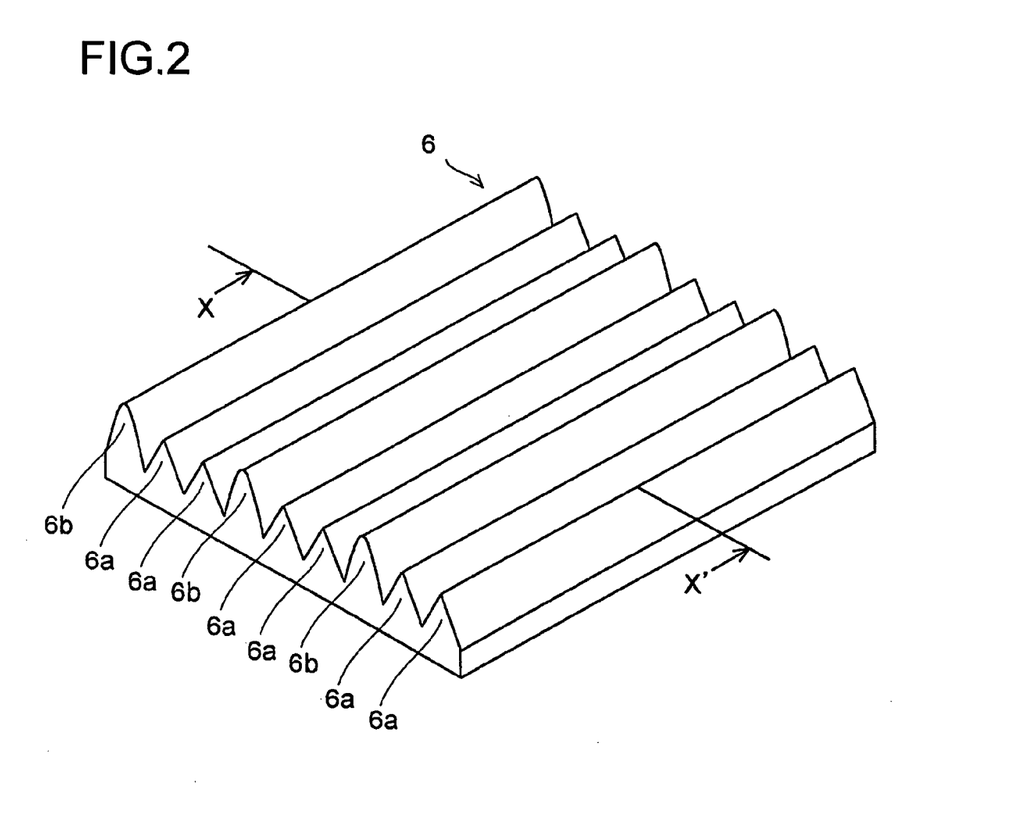
FIG. 2 A perspective view showing part of a prism sheet included in the liquid crystal display device according to the first embodiment of the invention shown in FIG. 1.
Figure 3:
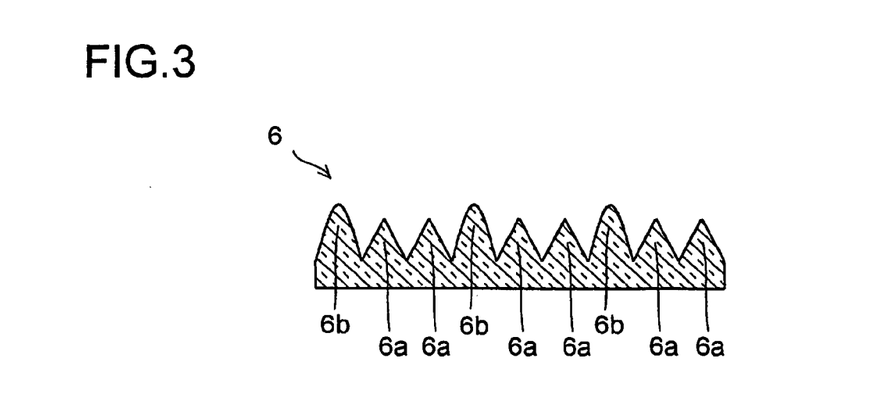
FIG. 3 A sectional view taken along line X-X' in FIG. 2.

FIG. 2 is a perspective view showing the prism sheet 6 according to the embodiment, which is included in the optical sheet 7, and FIG. 3 is a sectional view taken along line X-X' in FIG. 2.

The prism sheet 6 is a sheet member made of resin such as acrylic resin (PMMA), polystyrene (PS), or polycarbonate (PC), and has fine grooves and ridges provided alternately on its surface, which form first prism rows 6a with a triangular cross section. In addition, in parallel with the first prism rows 6a, in a predetermined ratio to them, second prism rows 6b are provided whose peaks are higher than those of the first prism rows 6a and rounded.

The first prism rows 6a condense the light from the linear light sources 4 toward the liquid crystal panel 3 with a view to enhancing the front-face brightness of the liquid crystal display panel 3; the sharper the peaks of the first prism rows 6a and the larger their slant surfaces, the higher their light-condensing ability, and thus the higher the brightness of the liquid crystal panel 3. On the other hand, the second prism rows 6b are made of the same resin material as the first prism rows 6a, and have their peaks located higher than those of the first prism rows 6a. Thus, when a sheet is laid over the prism surface, the peaks of the second prism rows 6b make contact with the main surface of the sheet. Here, the second prism rows 6b, with their peaks having a rounded cross section, can steadily hold the main surface of the sheet, and also function as prisms, though with a lower light-condensing ability. Moreover, the rounding gives the second prism rows 6b themselves satisfactory resistance to scratches.

Figure 4:
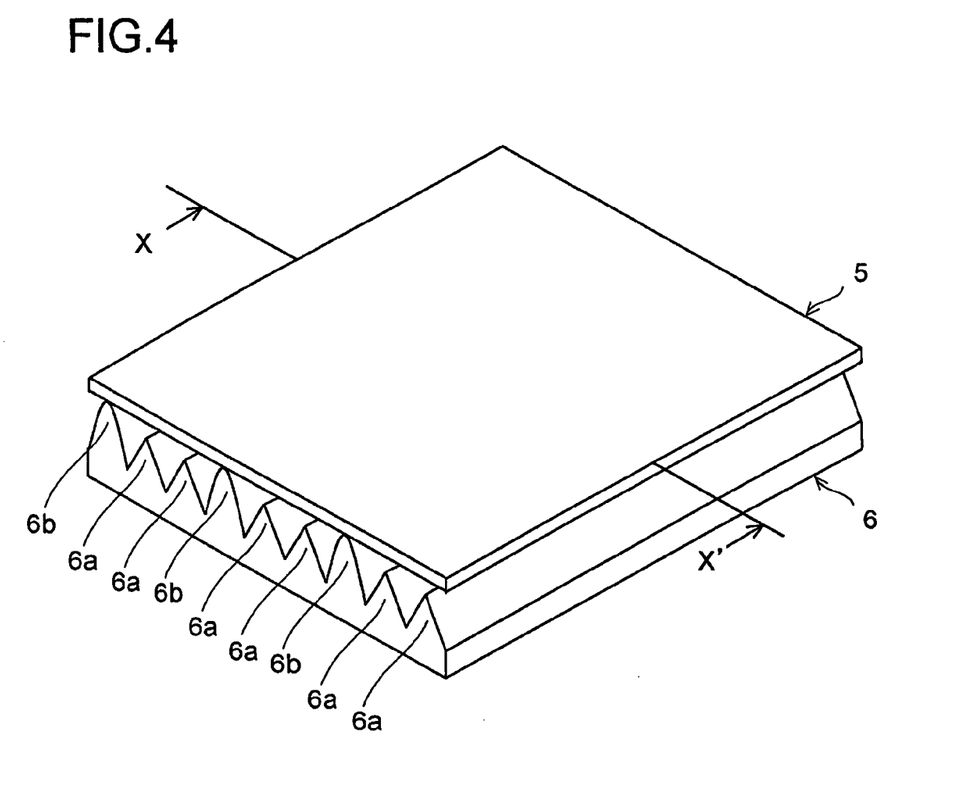
FIG. 4 A perspective view showing part of a prism sheet and a diffusion sheet included in the liquid crystal display device according to the first embodiment of the invention shown in FIG. 1.
Figure 5:
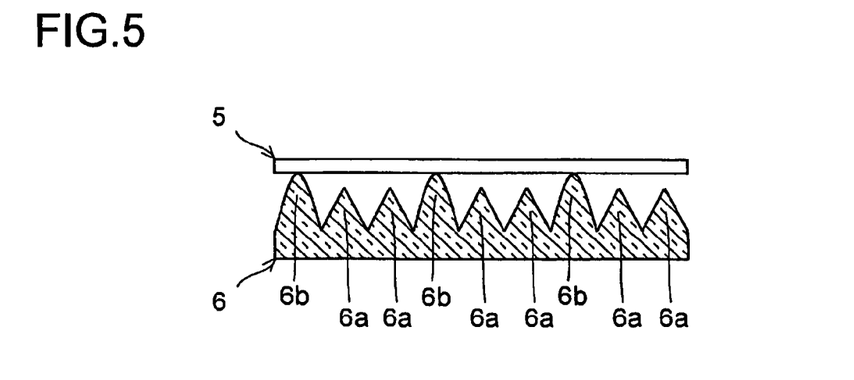
FIG. 5 A sectional view taken along line X-X' in FIG. 4.

FIG. 4 is a perspective view showing the diffusion sheet 5 laid over the main surface, on which the first prism rows 6a are formed, of the prism sheet 6 described above, and FIG. 5 is a sectional view taken along line X-X' in FIG. 4. The main surface of the diffusion sheet 5 is supported by the peaks of the second prism rows 6b, and since the peaks of the first prism rows 6a are located below the peaks of the second prism rows 6b, the main surface of the diffusion sheet 5 does not make contact with the peaks of the first prism rows 6a. Thus, even when the peaks of the first prism rows 6a are made sharp, the peaks of the first prism rows 6a are prevented from scratches.

The shapes of the peaks of the first prism rows 6a and the second prism rows 6b need to be appropriately adjusted according to the material and the size of the optical sheets; in a prism sheet 6 made of polycarbonate, when the shapes of the peaks of the first prism rows 6a were given a radius of 1 μm or less and the shapes of the peaks of the second prism rows 6b were given a radius of 3 μm or more, steady scratch prevention was achieved while a satisfactory light-condensing ability was obtained.

There is no need for the pitches of the first prism rows 6a and the second prism rows 6b to be equal; the number ratio of the first prism rows 6a to the second prism rows 6b is 2 to 1 in FIGS. 2 to 5 simply by way of explanation, and is not limited to that particular number. Since the second prism rows 6b, owing to their shape, have a lower light-condensing ability, the greater the proportion of the first prism rows 6a, the greater the effect of enhancing the brightness of the entire prism sheet. On the other hand, with a prism sheet 6 where the number ratio of the second prism rows 6b is low, although an increased light-condensing ability is obtained, the optical sheets laid over the prism surface cannot be supported steadily. Thus, the design of the second prism rows 6b needs to be determined with the material and the overall size of the prism sheet taken into consideration.

Second Embodiment

The liquid crystal display device according to this embodiment, like that of the first embodiment shown in FIG. 1, includes an illuminating device 2, a liquid crystal panel (light-controlling member) 3, and a display-device frame 9. The illuminating device 2 is composed of linear light sources 4, a lamp housing 10, a reflecting sheet (not shown), and a lamp holder 11; a diffusion plate 8 made of resin, an optical sheet 7, and an illuminating-device frame 12 are disposed between the liquid crystal panel 3 and the illuminating device 2.

With this structure, the light emitted from the light sources 4 passes through the diffusion plate 8 and the optical sheet 7, and is incident on the liquid crystal panel 3; by each pixel (or each cell) of the liquid crystal panel 3, the light intensity (gradation) is controlled or the light is colored. That is, the liquid crystal panel 3 generates display light by controlling the intensity and the color of the light emitted from the light sources 4 and transmitted through the diffusion plate 8 and the optical sheet 7.

The structures of the liquid crystal panel 3, the linear light sources 4, and the diffusion plate 8 are similar to those shown in connection with the first embodiment, and their workings are also similar.

Figure 6:
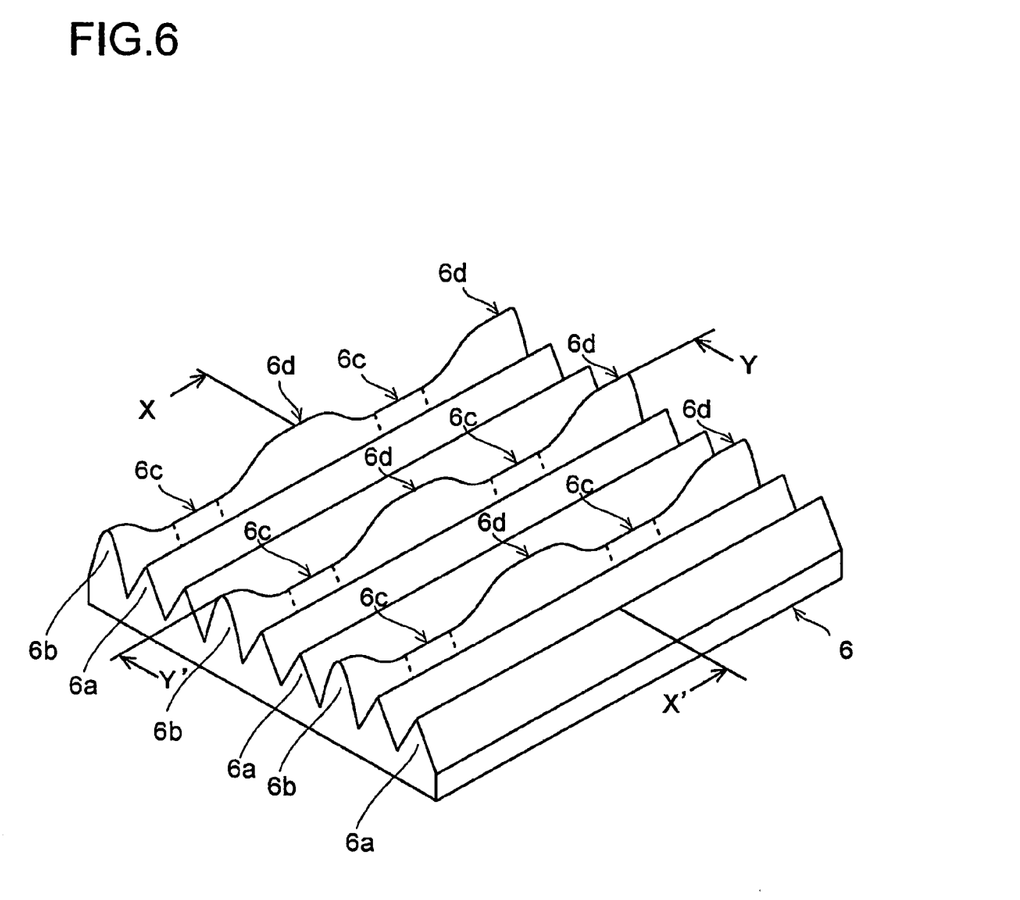
FIG. 6 A perspective view showing part of a prism sheet included in a liquid crystal display device according to a second embodiment of the invention.
Figure 7:
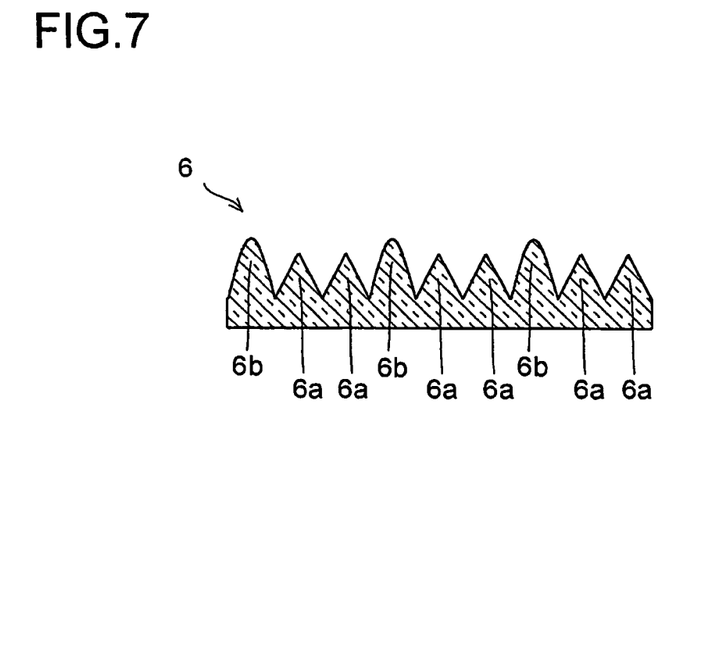
FIG. 7 A sectional view taken along line X-X' in FIG. 6.
Figure 8:
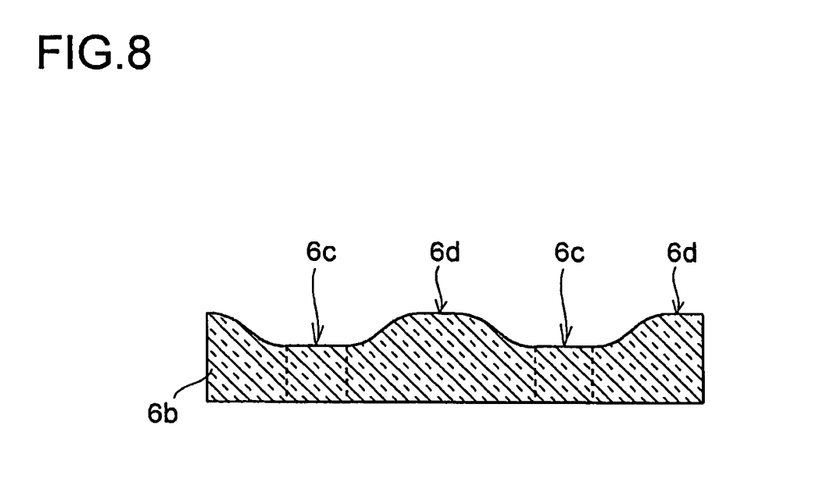
FIG. 8 A sectional view taken along line Y-Y' in FIG. 6.
Figure 9:
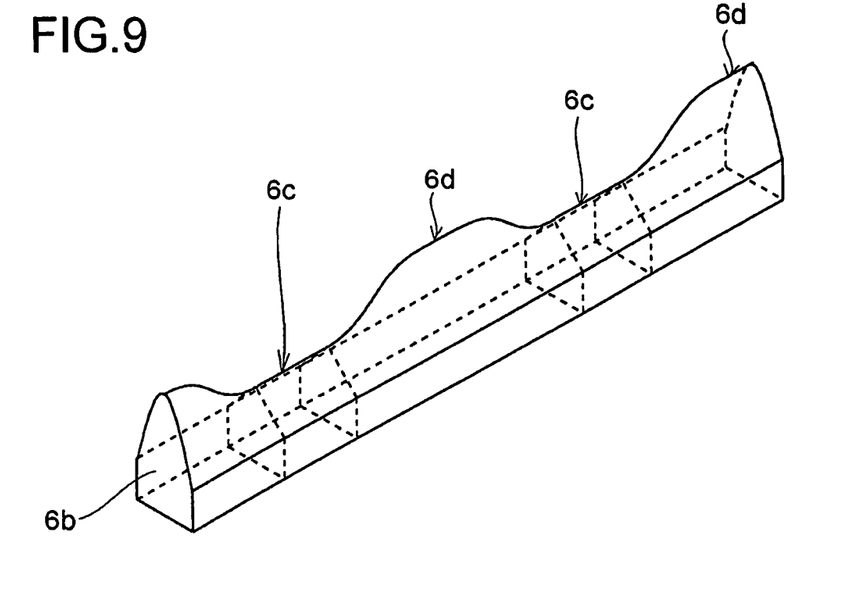
FIG. 9 An enlarged perspective view showing part of a second prism row included in the prism sheet shown in FIG. 6.
Figure 10:
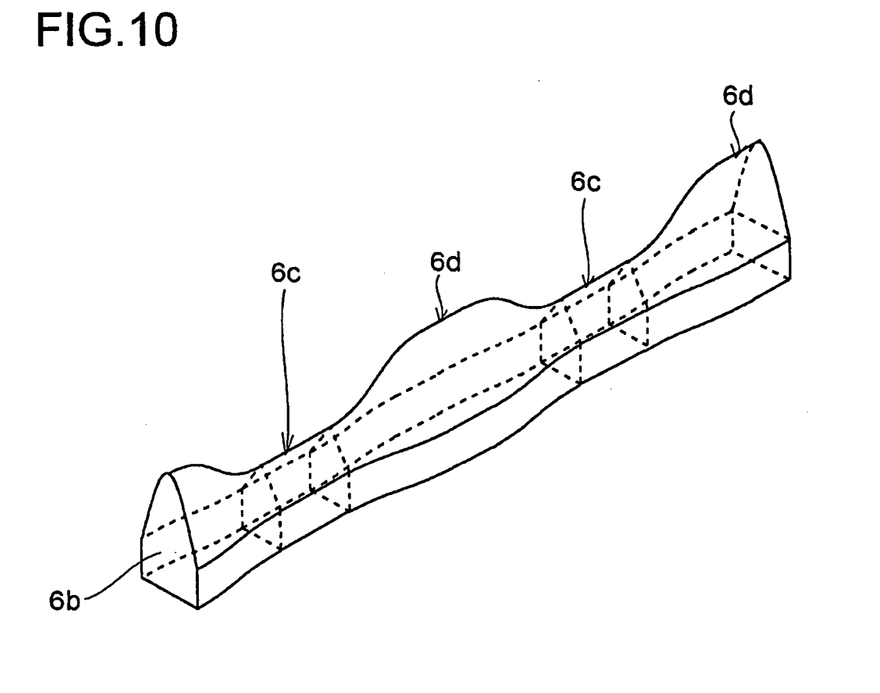
FIG. 10 An enlarged perspective view showing part of a second prism row according to a modified example of the second embodiment of the invention.

Next, a prism sheet 6 according to this embodiment will be described. FIG. 6 is an enlarged perspective view showing part of the prism sheet 6 according to this embodiment, FIG. 7 is a sectional view of the prism sheet 6 taken along line X-X' in FIG. 6, and FIG. 8 is a sectional view of the prism sheet 6 taken along line Y-Y' in FIG. 6. FIG. 9 is an enlarged perspective view showing one of the second prism rows 6b in FIG. 6, and FIG. 10 shows a modified example of the second prism row 6b in FIG. 9.

As shown in FIGS. 6 to 9, in a second prism row 6b, concave parts 6c and convex parts 6d are formed alternately. Here, the peaks of the concave parts 6c have a sharp cross section and are located at a lower level; the peaks of the convex parts 6d have a rounded cross section and are located at a higher level. In the following description, parts other than the concave parts 6c in the second prism row 6b are referred to as convex parts 6d.

With this structure, a difference in height is created in the ridge of the second prism row 6b, and when a sheet is laid over the prism surface, the entire sheet is supported by the convex parts 6d. Moreover, the peaks of the concave parts 6c, like the first prism rows 6a, do not make contact with the main surface of the overlaying sheet; thus, even when their peaks are made sharp, they are prevented from scratches.

In FIG. 6, simply by way of explanation, the convex parts 6d are provided close to one another at a predetermined interval; however, the smaller the proportion of the convex parts 6d in the second prism row 6b and the greater the proportion of the concave parts 6c, the larger the regions with sharp peaks, and thus the greater the effect of enhancing the brightness of the entire prism sheet 6. As shown in FIG. 9, the boundaries between the convex parts 6d and the concave parts 6c form gently curved surfaces. Here, if a step is formed at the boundaries between the convex parts 6d and the concave parts 6c, the step appears to be optically illuminating, and this leads to degraded quality of the display device. Thus, the boundary parts, the slant surfaces of the prism rows in particular, need to be formed with gently curved surfaces.

There is no need for the pitches of the concave parts 6c and the convex parts 6d to be equal; as shown in FIG. 10, the pitches of the concave parts 6c and the convex parts 6d may be varied, so that the groove lines forming the second prism row 6b are waved.

Figure 11:
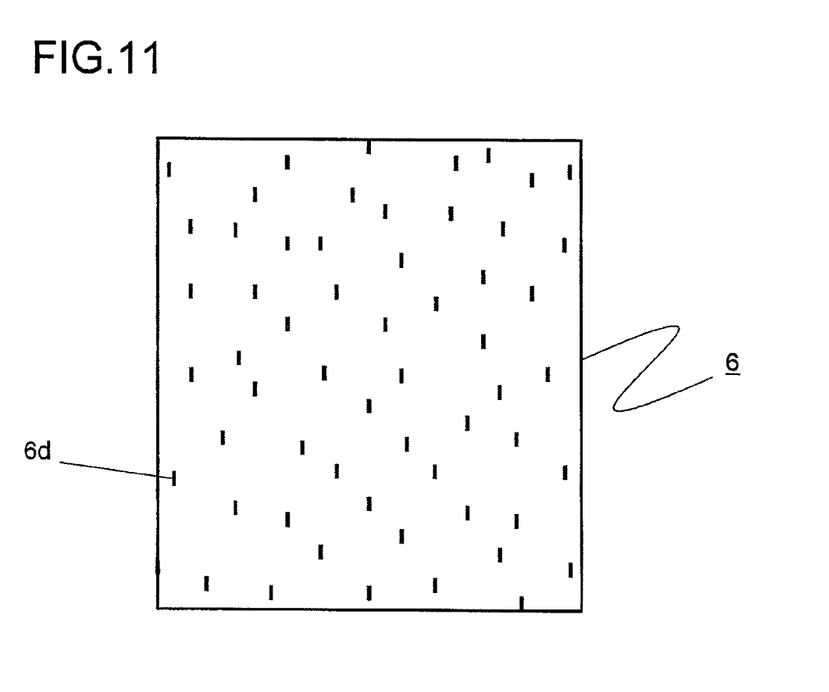
FIG. 11 A plan view of a prism sheet according to the modified example of the second embodiment of the invention.

It is preferable that the convex parts 6d be so formed as to evenly support the entire sheet laid over it; in addition, when the convex parts 6d are aligned in a straight line, they may cause interfere-induced unevenness with the lattice of a liquid crystal module. FIG. 11 shows a modified example of the prism sheet 6 according to this embodiment; as shown in FIG. 11, a prism sheet may be formed with the convex parts 6d disposed at random as seen in a plan view of the second main surface of the prism sheet 6. Note that, though the first prism rows 6a and the concave parts 6c are not shown in FIG. 11, the first prism rows 6a and the second prism rows 6b may be formed to meander, or the pitches of the concave parts 6c and the convex parts 6d may be varied, with a view to disposing the convex parts 6d at random.

It is to be understood that the embodiments described above are not meant to limit the present invention, which allows many variations and modifications, and embodiments achieved by combining together technical features disclosed in different embodiments also fall within the technical scope of the invention.

INDUSTRIAL APPLICABILITY

The present invention can be used in liquid crystal display devices of larger sizes.

The invention claimed is:

1. A liquid crystal display device, comprising:
a prism sheet including
    a first main surface on which light from a light source is incident and
    a second main surface from which the incident light emerges,
    the prism sheet having a plurality of first prism rows with a triangular cross section formed in parallel on the second main surface;
a light source so disposed as to be able to emit light onto the first main surface of the prism sheet; and
a liquid crystal panel disposed on the second main surface side of the prism sheet and controlling light emitted from the light source and transmitted through the prism sheet,
wherein a plurality of second prism rows are formed on the second main surface, and
wherein ridges of the second prism rows are composed of convex parts with high peaks and concave parts with low peaks formed alternately, the peaks of the convex parts have a rounded cross section and are higher than peaks of the first prism rows, and a cross-sectional shape of the peaks of the concave parts is sharp, and only the convex parts make contact with an optical sheet disposed on the second main surface side of the prism sheet, such that scratching of the optical sheet is substantially prevented by the rounded peaks of the convex parts making contact with the optical sheet.

2. The liquid crystal display device according to claim 1, wherein a radius of the cross-sectional shape of the peaks of the convex parts is 3 μm or more.

3. The liquid crystal display device according to claim 1 or 2, wherein the convex parts are disposed at random as seen in a plan view of the second main surface.

* * * * *